United States Patent [19]

O'Dea

[11] Patent Number: 4,555,593
[45] Date of Patent: Nov. 26, 1985

[54] ELECTRONIC TELEPHONE RELAY

[75] Inventor: Orrin B. O'Dea, Garden Grove, Calif.

[73] Assignee: Microcommunications, Inc., Santa Ana, Calif.

[21] Appl. No.: 467,011

[22] Filed: Feb. 16, 1983

[51] Int. Cl.[4] .......................... H04Q 1/36; H04Q 3/14
[52] U.S. Cl. .......................... 179/18 GD; 179/16 EA; 307/132 EA
[58] Field of Search ....... 179/18 GD, 16 EA, 16 AA, 179/18 EB; 307/132 EA, 255, 254; 375/4

[56] References Cited

U.S. PATENT DOCUMENTS 4,326,105  4/1982  Vaughan et al. .............. 179/16 EA
4,375,014  2/1983  Horak ........................... 179/16 EA Primary Examiner—Thomas W. Brown
Attorney, Agent, or Firm—Freilich, Hornbaker, Rosen & Fernandez

[57] ABSTRACT

An electronic relay circuit for replacement of an A-type relay in a step-by-step selector and connector of a telephone exchange system is implemented with a first operational amplifier (10) connected to the tip (T) and ring (R) conductors of a telephone line, and a second operational amplifier (24') with hysteresis for use as a comparator. A capacitor (C1) with a diode (D1) in parallel couples the input terminal of the comparator to a reference voltage from a voltage divider (R1, R2) in order that signal transitions from the input amplifier appear as common mode signals for a period determined by the RC time constant of a coupling resistor (R3) for ON-HOOK to OFF-HOOK transitions limited in amplitude by the parallel diode (D1) and the RC time constant of a resistor (R4) connected to a source of negative voltage for OFF-HOOK to ON-HOOK transitions limited in amplitude by a series diode (D2). A diode (D3) in series with the voltage divider introduces a compensating voltage drop for the diode (D2). The first amplifier is provided with a low-pass band of at least twice the dialing frequency (15 Hz).

6 Claims, 4 Drawing Figures

ELECTRONIC TELEPHONE RELAY

BACKGROUND OF THE INVENTION

This invention relates to an electronic relay, and more particularly to an electronic circuit for replacement of an A-type relay in a step-by-step selector and connector of a telephone exchange system. The A-relay is of the make-break type that responds to a subscriber's dial, or other pulsing device. Each pulse causes a moving contact to break from one relay contact and make another contact.

The telephone exchange system includes a mechanism for finding a free first selector for the first digit dialed, and successive free selectors and connector for the successive digits dialed. However, the present invention relates only to a circuit for replacing the A-relay that operates a selector or connector at each step in response to the pulses of a digit dialed.

The inherrent inertia of a mechanical relay is used to advantage in an A-type relay for preventing spurious pulses (short duration transient voltages) on the input conductors, called tip and ring, from affecting the make and break contact conditions. The problem with mechanical make-break relays is that they require periodic adjustment and contact replacement. It would be desirable to have a solid-state electronic circuit as a replacement for the make-break relay which will endure constant use for an indefinite time without adjustment.

Such solid-state circuits have been devised as field replacements for the A-type relay. They include a first differential operational amplifier having its inputs connected to detect the voltage difference between the ring and tip conductors of a subscriber's telephone line, or the equivalent conductors from SXS telephone switches, and a second saturating operational amplifier used as a comparator with hysteresis to compare the output of the first with a reference for controlling two electronic switches, one of which is normally on to connect its output terminal to a common (ground) terminal corresponding to the moving contact of the A-type (make-break) relay, and the other of which is normally off.

This normal condition exists while the subscribers line is idle, i.e., while the telephone is ON HOOK, and the output of the first amplifier is more negative than the reference. When the telephone is OFF HOOK, the output of the first amplifier becomes less negative than the reference, i.e., becomes positive with respect to the reference, and the second amplifier reverses state to cause the two electronic switches to reverse states, thereby connecting the make terminal to the common terminal. Thereafter, each dial pulse momentarily changes the first and second amplifiers back to their idle states, which momentarily connects the break output terminal to the common terminal.

To avoid operating the electronic output switches in response to spurious pulses, the circuit is arranged so that all voltage changes at the output of the first amplifier initially appear as common mode signals at the input of the comparator. This is accomplished by connecting a capacitor between the input terminals of the comparator. A silicon diode in parallel with this capacitor connects the output of the first amplifier to the reference voltage source that is applied to the comparator so that the reference voltage (with which the output signal of the first amplifier is compared) will track the output signal of the first amplifier within the voltage drop of the diode as that output signal changes to be less negative than the reference voltage.

How long the output of the first amplifier is permitted to appear as a common mode signal at the second amplifier is controlled by the RC time constant of the capacitor and a resistor coupling the output of the first amplifier to the capacitor. This RC time constant is selected to allow the circuit to respond to dial pulses in the output of the first amplifier, but not to spurious transients which might occur on the ring and tip conductors connected to terminals of the first amplifier. In that manner, the capacitor of the RC timing circuit makes all voltage changes at the output of the first amplifier appear as common mode signals to the comparator for a period designed to render the circuit operation immune to transients above the maximum dial pulse frequency of 15 Hz. In other words, the timing resistor is selected to control the interval required to charge the capacitor and thus control the upper limit of low frequencies to which the circuit will respond. Stated yet another way, this arrangement of a resistor and a capacitor functions as a low-pass filter to effectively shunt high frequency transients and pass to the comparator only the low-frequency dial pulses. The coupling resistor and shunt capacitor thus make the output of the comparator insensitive to transients on the input terminals of the first amplifier. In practice, the RC time constant is selected to be about 10 ms, a period long enough to cover some electrical (or mechanical) anomalies in the SXS telephone switching equipment.

A prior-art electronic A-type relay circuit thus performs as a DC circuit for transitions at frequencies between 0 and 15 Hertz, a low frequency band sufficient to include dialing pulses. However, the transitions of the prior-art relay circuit are not independently controlled at both the beginning and the end of the dial pulses, i.e., the prior art circuits do not independently control transitions from ON HOOK (idle) to OFF HOOK (busy), and from OFF HOOK to ON HOOK, which is how dial pulses are generated.

This lack of independent control over the RC time constant at the beginning of dial pulses is due to the fact that, for protection against spurious transitions that may appear as the beginning of dial pulses (OFF-HOOK to ON-HOOK transitions), the same coupling resistor is relied upon for the RC time constant, and the input amplifier is designed with a narrow low-pass filter (0 to 15 Hz). The low-pass filter causes a pronounced lengthening of the rise and fall of the dial pulse, which in turn affects the crossover time of the amplifier 10 output with respect to the reference voltage. This causes the overall timing to vary considerably between long and short telephone loops.

It would be desirable to independently control the RC time constant at the beginning of the dial pulses, i.e., at transitions from OFF HOOK to ON HOOK, as well as from ON HOOK to OFF HOOK. It would also be desirable to increase the cut-off frequency of the first amplifier to at least twice the maximum dial pulse frequency of 15 Hz to make response to dial pulses more reliable.

SUMMARY OF THE INVENTION

In accordance with the present invention, the noninverting and inverting input terminals of a first differential operational amplifier are connected to respective tip (T) and ring (R) conductors of a telephone circuit. That first amplifier, designed as a low-pass amplifier, is designed to divide the input signal by a significant factor, such as by 10. The ring conductor is biased through an inductor connected to a source of voltage of one level (e.g., −50 V), and the tip conductor is biased through an inductor connected to a source of voltage at another level (e.g., 0 V). In that manner, the output of the first amplifier is a fraction of the voltage at one level (e.g., −5 V) while the telephone circuit is ON HOOK (idle) and at a lower (less negative) voltage while the telephone circuit is OFF HOOK (busy). The OFF-HOOK voltage is dependent on loop length, and is zero with respect to signal ground only when the tip and ring conductors are shorted. The output of the differential amplifier is DC coupled to the noninverting input terminal of a second saturating operational amplifier used as a comparator with hysteresis for comparing that output of the first amplifier with a reference voltage derived from a voltage divider connected between the two sources of bias voltage for the input terminal of the first amplifier. This voltage divider is designed to also divide by the same factor as the first amplifier so that variations in the power supply will not have any effect on the operation of the circuit.

The capacitor of an RC timing circuit is connected between the noninverting input terminal and the inverting input terminal of the comparator. The junction of the noninverting input of the comparator and the capacitor is connected to the output of the first amplifier by a diode and resistor in series. The diode is poled for current flow into the capacitor when the output of the first amplifier is less negative than the reference voltage, and to be back biased when the output of the first amplifier is more negative. That diode thus functions as a switch to disconnect the first amplifier during the transition from OFF to ON HOOK, which is at the beginning of dial pulses. For RC timing the period of common mode coupling of a signal from the first amplifier to the second at the beginning of the dial pulses, a separate resistor is connected between a source of negative bias voltage and the capacitor. The two timing resistors thus form a voltage divider with one end connected to the output of the first amplifier by the switching diode. Providing separate resistors for RC timing of both transitions of a dialing pulse allows independent control of each. The input amplifier may then be designed to pass frequencies of at least twice the maximum dial pulse frequency of 15 Hz for improved operation of the circuit.

The switching diode also serves to limit the voltage level to which the capacitor may be charged during an ON-HOOK condition. A separate diode in parallel with the capacitor limits its voltage level of opposite polarity during the OFF-HOOK condition of dial pulses. The output of both RC timing circuits is thus connected to one input terminal of the comparator for comparison with a reference voltage derived from a voltage dividing network. That network is connected to circuit ground through a diode to provide a compensating voltage drop in the reference voltage for the voltage drop of the switching diode at the output of the first amplifier. Also in series with the compensating diode is a Zener diode for providing a signal ground (−6.2 V) coupled to the noninverting input of the first amplifier by a low-pass filter.

A diode poled for conduction during dial pulses is connected in series with the output terminal of the second amplifier to isolate it between dial pulses from two transistor switches operated by the second amplifier. One of the two transistor switches is turned on to provide a circuit from a MAKE conductor to a common terminal during an OFF-HOOK (busy) condition and the other transistor switch is turned on to provide a circuit from a BREAK conductor to a common terminal during an ON-HOOK (idle or dial pulse) condition.

DESCRIPTION OF PREFERRED EMBODIMENTS

Figure 1:
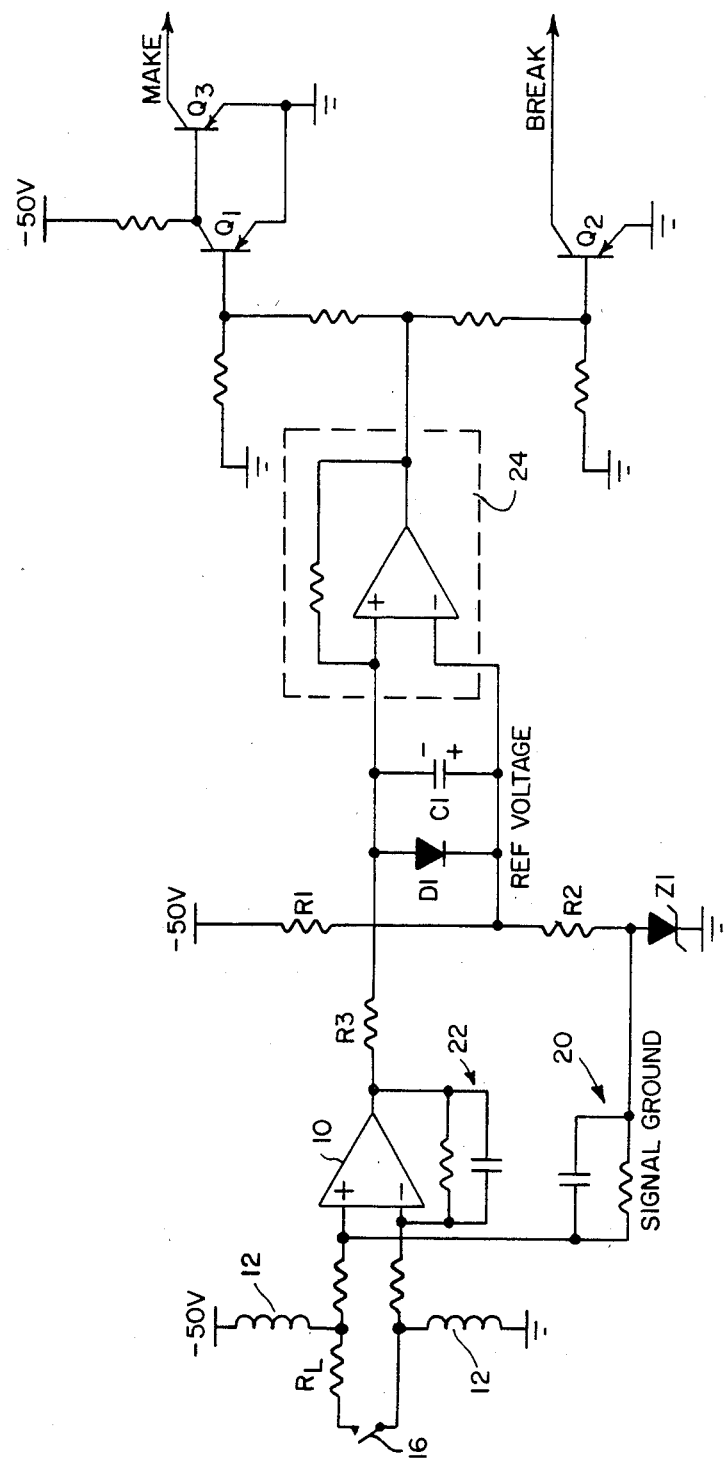
FIG. 1 illustrates a prior-art solid-state A-type relay circuit.
Figure 2:
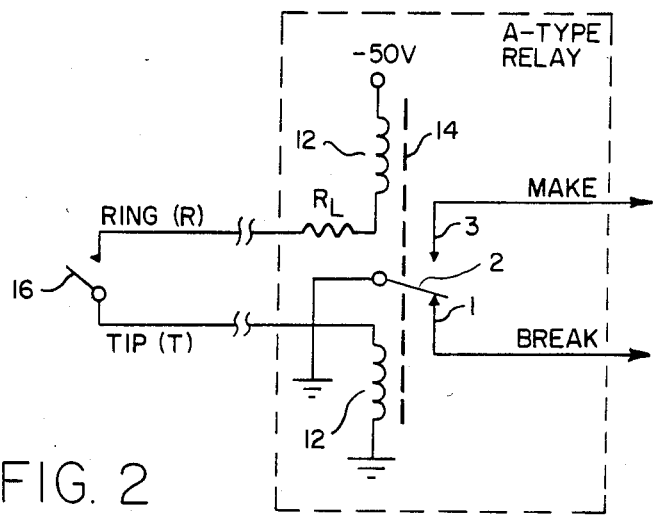
FIG. 2 illustrates schematically an A-type electromagnetic relay.
Figure 4:
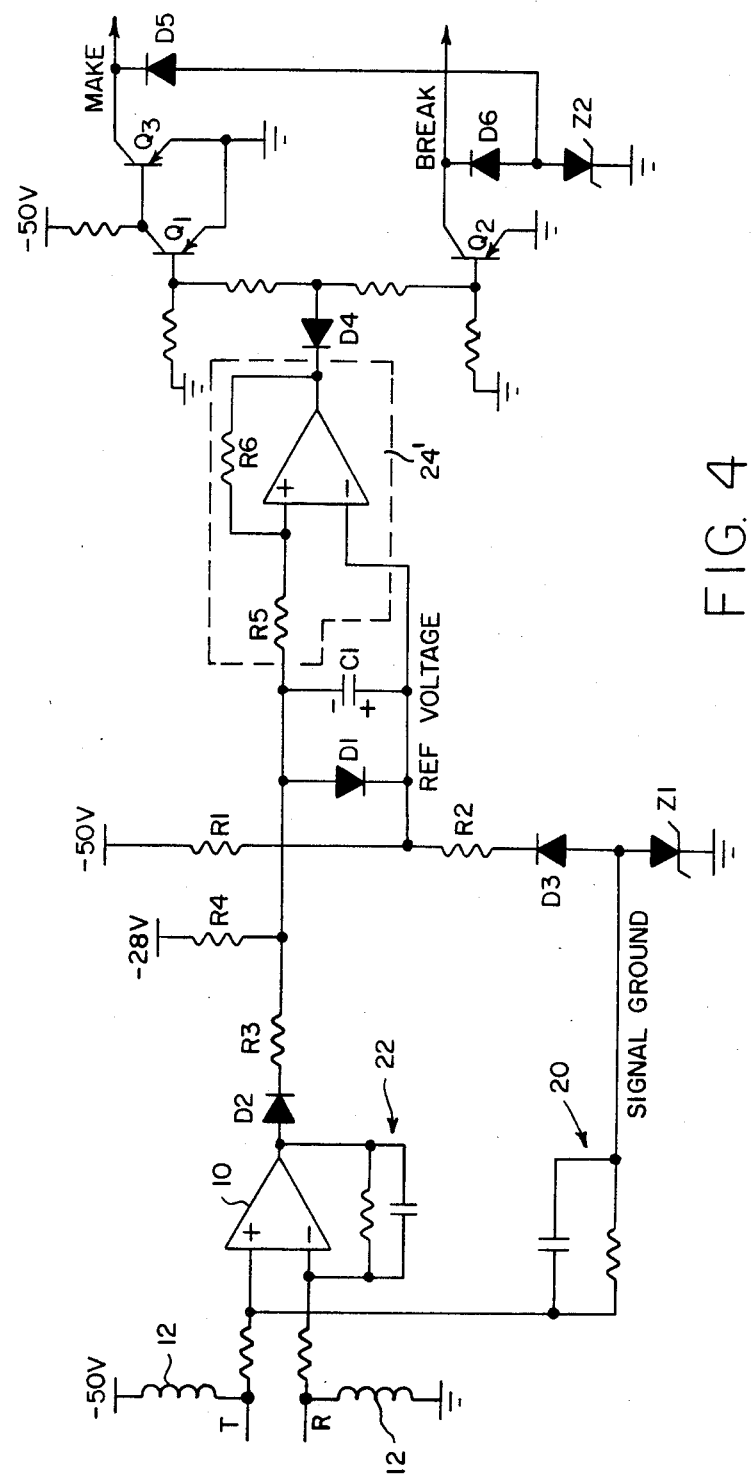
FIG. 4 illustrates a solid-state A-type relay circuit according to the present invention.

Before describing the present invention with reference to FIG. 4, a typical prior-art circuit will be described with reference to FIG. 1. That circuit is designed as a replacement for the pulsing contacts on the electromagnetic A-type relay in a step-by-step selector or connector of a central telephone system. A differential operational amplifier 10 arranged to divide by a factor of ten is connected to the tip (T) and ring (R) terminals of a split relay coil 12 of the A-type relay being replaced. That relay is shown schematically in FIG. 2. The armature 14 of the relay being replaced is removed, and its common (MOVING) contact 2 is also removed, along with its BREAK and MAKE contacts, 1 and 3 respectively.

While a telephone is ON-HOOK (idle), the telephone switch 16 (FIG. 2) connected to the tip and ring conductors is open, as shown, and the MOVING contact 2 of the relay is held against the BREAK contact 1 by the force of a spring (not shown). When the telephone is OFF-HOOK (busy), the telephone switch 16 is closed. This allows current through the relay coil 12. The electromagnetic field thus created moves the armature 14 upwardly against the force of the spring. This in turn carries the MOVING contact 2 to a position against the MAKE contact 3. Placing the telephone back ON-HOOK, or otherwise opening the relay coil circuit in response to a dialing switch (not shown), will release the armature to carry the MOVING contact 2 back onto the BREAK contact 1.

In some installations, the A-type relay connects to the tip and ring conductors of a subscriber's line, while in others it connects to the tip and ring terminals of SXS telephone switches. In either case, when the solid-state A-type relay circuit of FIG. 1 replaces the electromagnetic relay of FIG. 2, the relay coils 12 are left in the telephone switching circuit in order to maintain good circuit balance, and the circuit ground is connected to the relay coil ground. The relay coil battery terminal (−50 V) is connected to one end of a voltage divider comprised of resistors R1 and R2 in series with a Zener diode Z1.

The junction of the Zener diode Z1 is connected to the ring terminal by a low-pass network 20 to provide a signal ground. A high-pass network 22 between the output terminal and the inverting input terminal attenuates the frequencies above the pass band of the low-pass network. The amplifier 10 is thus designed as a low-pass amplifier.

The junction between the resistors provides a reference voltage for the electronic relay circuit. This reference voltage is slightly less negative than and tracks with the ON-HOOK output voltage of the amplifier 10 which is coupled by a resistor R3 to the noninverting input terminal of a comparator 24 comprised of a saturating operational amplifier with hysteresis. The inverting terminal of the comparator 24 is connected to the reference voltage.

The circuit described thus far performs as a DC device, except during transitions when a capacitor C1 makes the transitions appear as common mode signals to the comparator 24. A diode D1 in parallel with the capacitor C1 limits the voltage applied to the capacitor in the busy (OFF-HOOK) condition. A similar but oppositely poled diode may be provided in parallel to limit the voltage applied to the capacitor in the idle (ON-HOOK) condition.

The capacitor C1 is normally charged as shown (negative) for the ON-HOOK condition. Since the amplifier 10 is arranged to divide by a factor of 10, its output with respect to signal ground will be 1/10th of the voltage between the ring and tip terminals, namely $-5$ V. When the telephone goes OFF HOOK, the switch 16 connects the ring and tip conductors, causing the differential input of the amplifier 10 to drop from $-50$ V to some low voltage, for example $-30$ V, depending upon the telephone loop length. The output of the amplifier then becomes less negative ($-3$ V for this example).

The reference voltage determines the maximum loop length that will be recognized as OFF HOOK. The choice for the reference voltage is not unlimited because the voltage-dividing resistors R1 and R2 must be very close to a 10 to 1 ratio in order for the reference voltage to track the ON-HOOK output of the amplifier 10. This tracking makes the circuit insensitive to variations in the power supply voltages. Limiting the voltage charge on the capacitor C1 with the diode D1 minimizes the difference in circuit performance between short and long telephone loop lengths.

When the output of the amplifier 10 is more negative (ON-HOOK condition) than the reference voltage by an amount required by the hysteresis of the comparator 24, the output of the comparator 24 will be approximately $-25$ V. This condition turns on transistors $Q_1$ and $Q_2$, and turns off transistor $Q_3$ to connect the BREAK contact to circuit ground. When the output of the amplifier 10 is less negative (OFF-HOOK condition) by an amount required by the hysteresis of the comparator, the output of the comparator 24 switches to 0 volts, thus switching transistor $Q_2$ off and switching transistor $Q_3$ on. A resistor R6 provides positive feedback (hysteresis) for the comparator 24 to make its output transitions both fast and stable at the crossover points.

The cut-off frequency for the amplifier 10 is set at 15 Hz, the maximum dialing pulse frequency. Since this amplifier cannot respond to transients above 15 Hz, its output is very stable. It is therefore not necessary to limit the voltage to which the capacitor C1 is charged of polarity shown when the output of the amplifier 10 is more negative than the reference, (i.e., during the ON-HOOK (idle) condition. However, the diode D1 is provided to limit the voltage charge of the capacitor in the OFF-HOOK (busy) condition.

Figure 3:
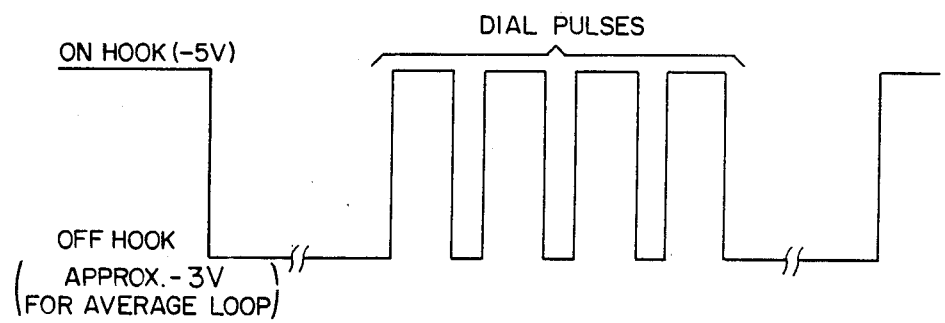
FIG. 3 is a waveform illustrating dial pulses in the circuit of FIG. 1.

In operation, the output of comparator 24 is $-25$ V (approximately) only when the output of the amplifier 10 is in the ON-HOOK (idle) condition ($-5$ V) with respect to signal ground. Thus, while the output of the amplifier 10 is more negative than the reference voltage, the output of the comparator 24 is negative, and while the output of the amplifier 10 is less negative than the reference, the output of the comparator 24 is 0 volts. Initially all voltage changes at the output of the amplifier 10 appear as common mode signals at the input of the comparator 24. How long such a voltage change appears as a common mode signal is primarily controlled by the RC time constant of the resistor R3 and the capacitor C1, but is greatly influenced by the telephone loop length, particularly during OFF-HOOK to ON-HOOK transitions. Since the loop length affects the overall RC time constant of the circuit differently for transitions to OFF HOOK than to ON HOOK, and the effect is greater for transitions to ON HOOK, timing the common mode signal presentation of a transition to the comparator 24 is controlled within acceptable limits for the ON-HOOk to OFF-HOOK transitions. Since dial pulses are generated from an OFF-HOOK condition, the beginning of dial pulses appear as OFF-HOOk to ON-HOOK transitions, as shown in FIG. 3. How long these OFF-HOOK to ON-HOOK transitions appear as common mode signals depends too much on the resistance of the telephone loop which varies with length. Consequently, the RC time constant is not sufficiently controlled for OFF-HOOK to ON-HOOK transitions. It would be desirable to independently control the RC time constant for OFF-HOOK to ON-HOOK transitions for better discrimination of dial pulses. The input amplifier could then be designed with a wider band pass (0 to 30 or 40 Hz, for example) to improve the over-all operation of the circuit.

From the foregoing review of the prior art, it is evident that with only one timing resistor for both charging and discharging the capacitor, the duration of the common mode can be adjusted properly for transitions in only one direction (ON HOOK to OFF HOOK). Adjustment of the RC time constant controlled by the resistor R3 and the capacitor C1 is therefore correct only at the end of a dial pulse. Transitions at the beginning of a dial pulse (OFF HOOK to ON HOOK) are presented as common mode signals to the comparator 24 for a period that is affected too much by the telephone loop impedance, which varies with loop length, to be effective. The impedance of the telephone loop is represented in FIG. 1 by a lumped resistor $R_L$.

An improved electronic relay circuit will now be described with reference to FIG. 4. Since the basic organization of the prior-art circuit has been retained, the same reference numerals are used for the corresponding components to facilitate understanding the present invention.

Amplifier 10 connects to the tip (T) and ring (R) conductors of the telephone connector or selector circuit. As in the prior art, the output of the comparator 24 is negative ($-25$ V) with respect to circuit ground when the telephone circuit is idle (ON HOOK), which means an open circuit between the tip and ring conductors, and positive (0 V) with respect to circuit ground when the telephone circuit is busy (OFF HOOK), which means a closed telephone circuit. (The telephone circuit, represented by a switch 16 and resistor $R_L$ in FIG. 1, is not shown in FIG. 4.)

Resistors R1 and R2 in series with diode D3 and a Zener diode Z1 provide a reference voltage for the inverting input terminal of the comparator 24'. An input resistor R5 is provided which is small (2.2K) in comparison with a feedback resistor R6 (470K) so that the comparator will have significant hysteresis, and thus provide greater stability for the circuit. The hysteresis of the comparator 24 of the prior-art circuit was not so directly, and therefore effectively, controlled.

The Zener diode Z1 provides a signal ground at −6.2 V to the noninverting input terminal of the amplifier 10 through a low-pass network 20 having a wide bandpass of at least twice the maximum dial pulse frequency (e.g. 30 or 40 Hz). The inverting input terminal of the amplifier 10 is connected to its output by high-pass network 22 of the same bandwidth to balance the low-pass network 20 at the noninverting input terminal.

The OFF-HOOK time constant is controlled by resistor R3 and capacitor C1, as in the prior art circuit, but with a diode D2 in series with the resistor R3, the amplifier 10 is disconnected from the resistor R3 during the transition from OFF HOOK to ON HOOK. The output of the amplifier will stay disconnected for a period controlled by a resistor R4, which is to say for the time it takes the negative voltage level of the capacitor C1 to change sufficiently to forward bias the diode D2 for the normal ON-HOOK condition. The diode D2 then clamps the capacitor C1 to restrict the total charge the capacitor may reach (of the polarity shown) to the voltage drop across that diode (approximately 0.7 V). The diode D1 limits the total charge of the capacitor for the OFF-HOOk condition as in the prior art.

As noted hereinbefore with reference to FIG. 3, the dial pulses are transitions to ON HOOK, then back to OFF HOOK. The capacitor C1 presents both transitions to the comparator 24' as common mode signals for the period of time it takes the capacitor C1 to charge to the polarity shown in the drawing, and then back again to the opposite polarity. The separate resistor R4 provides control of the ON-HOOk time constant, i.e., the time it takes the capacitor to charge at the beginning of a dial pulse. The diode D2 thus acts as a switch to disconnect the amplifier 10 during that transition, as just noted above. The amplifier will stay disconnected until the charge of the ON-HOOK polarity shown is sufficient to forward bias the diode D2. Diode D3 is included in series with the resistor R2 to provide a compensating voltage drop for the reference voltage that the diode D2 adds to the output of the amplifier 10. By providing independent RC timing for the common mode signal presented to the comparator 24' by the capacitor C1 during both OFF HOOK and ON-HOOK transitions, it is possible to increase the frequency response of the input amplifier 10 to at least twice the dialing pulse frequency for improved over-all operation of the circuit.

The output of the amplifier drives the transistor switches which make up the electronic relay MAKE and BREAK terminals as in the prior art, where it is assumed that the circuit ground is not subject to being switched. In those applications where the circuit ground for the relay MAKE and BREAK transistors may be switched, a diode D4 is included in series with the output of the comparator 24'. The diode D4 acts like an automatic switch to isolate the comparator 24' from the relay transistors $Q_1$ to $Q_3$ whenever the circuit ground of those transistors is switched open. If that should occur, the negative bias voltage (−50 V) from the relay transistors would be fed back to the output of comparator 24'. The diode D4 protects the comparator. Although shown as simple PNP transistors, in practice the transistors $Q_2$ and $Q_3$ would be implemented with TIP 27 relay drivers (integrated circuit Darlington pairs) rated at 75W, 3A and 100 V.

The MAKE and BREAK output terminals are connected to inductive loads being driven. To limit the inductive kickback voltage from the coils to the transistors $Q_2$ and $Q_3$, the MAKE and BREAK terminals are coupled to circuit ground by a Zener diode Z2 and diodes D5 and D6. The diodes D5 and D6 allow one Zener diode to serve both transistor switches. In practice, a separate Zener diode may be connected to the output of each transistor switch.

What is claimed is:

1. In an electronic circuit for replacement of an A-type relay in a step-by-step selector or connector of a telephone exchange system having: a first differential operational amplifier having inverting and noninverting input terminals adapted to be connected to respective tip and ring conductors of a telephone line without disconnecting relay coils of said A-type relay from said conductors, one of said relay coils being connected between circuit ground and the tip conductor and the other relay coil being connected between a source of negative voltage and the ring conductor, whereby said first amplifier produces a negative output signal when a telephone switch between the tip and ring conductors is open for an ON-HOOK condition of the telephone line, and a less negative output signal when said telephone switch is closed for an OFF-HOOK condition of the telephone line; a second differential operational amplifier having inverting and noninverting input terminals, said inverting input terminal being connected to a reference voltage derived from a voltage divider, and said noninverting input terminal being connected to the output of said first differential amplifier by means comprising a coupling resistor; a capacitor connected between the output of said coupling resistor and the inverting input terminal of said second differential amplifier, thereby to couple signals from said first differential amplifier to said second differential amplifier as common mode signals for a period determined by the RC time constant of said coupling resistor and capacitor; and a diode in parallel with said capacitor poled to limit the voltage charge of said capacitor in the OFF-HOOK condition, an improvement comprising a second diode connected in series between the output of said first differential amplifier and said coupling resistor, and a second resistor, connected from a source of negative voltage to a junction between said capacitor and coupling resistor, whereby ON-HOOK to OFF-HOOK transitions are presented as common mode signals to said second differential amplifier for periods controlled by the RC time constant of said coupling resistor and capacitor while OFF-HOOK to ON-HOOK transistions are presented as common mode signals to said second differential amplifier for periods independently controlled by the RC time constant of said second resistor and capacitor, thereby providing controlled RC timing of transitions at both the beginning and the end of dial pulses which are transitions from OFF HOOK to ON HOOK then back to OFF HOOK.

2. An improvement as defined in claim 1 including a third diode, in series with the voltage divider from which the reference is derived for compensating a voltage drop that said second diode introduces into the circuit during an OFF-HOOK condition.

3. An improvement as defined in claim 2 wherein said first differential amplifier includes a low-pass band filter for frequencies from zero to at least twice a predetermined maximum dialing pulse frequency.

4. An improvement as defined in claim 3 wherein said second differential amplifier is provided with a feedback resistor from its output to its noninverting input terminal and an input resistor between said capacitor and said noninverting input terminal, the ratio of said feedback resistor to said input resistor being selected to be about 200 to 1 for high hysteresis, and therefore high stability.

5. An improvement as defined in claim 1 wherein said first differential amplifier includes a low-pass band filter for frequencies from zero to at least twice a predetermined maximum dialing pulse frequency.

6. An improvement as defined in claim 5 wherein said second operational amplifier is provided with a feedback resistor from its output to its noninverting input terminal and an input resistor between said capacitor and said noninverting input terminal, the ratio of said feedback resistor to said input resistor being selected to be about 200 to 1 for high hysteresis, and therefore high stability.

* * * * *